United States Patent [19]

D'Alterio

[11] Patent Number: 4,996,914
[45] Date of Patent: Mar. 5, 1991

[54] APPARATUS FOR ENCAPSULATING FILLER WITH DOUGH

[76] Inventor: Joseph C. D'Alterio, 64 Sugar Maple La., Glen Cove, N.Y. 11542

[21] Appl. No.: 468,117

[22] Filed: Jan. 22, 1990

[51] Int. Cl.$^5$ .......................... A21C 9/00; A21C 9/06; A23P 1/00
[52] U.S. Cl. .................................. 99/450.6; 99/450.2; 99/450.7; 141/270; 222/162
[58] Field of Search ................. 99/450.1, 450.2, 450.6, 99/450.7, 494, 352, 353; 425/112, 115, 131.1; 366/154, 155; 222/162; 141/237, 241, 246, 270

[56] References Cited

U.S. PATENT DOCUMENTS

| | | | |
|---|---|---|---|
| 319,684 | 6/1885 | Euston | 222/161 |
| 1,108,461 | 8/1914 | Michitsch | 99/450.2 |
| 1,847,292 | 3/1932 | Booth et al. | 222/162 |
| 2,227,728 | 1/1941 | Lombi | 99/450.2 |
| 2,774,313 | 12/1956 | Lombi | 99/450.2 |
| 3,605,641 | 9/1971 | Shuster | 99/450.7 |
| 4,160,634 | 7/1979 | Huang | 99/450.6 |
| 4,418,845 | 12/1983 | Hehl | 222/162 |
| 4,585,040 | 4/1986 | Cramer | 141/270 |
| 4,848,218 | 7/1989 | Battaglia | 99/450.6 |
| 4,942,910 | 7/1990 | Hamamura | 141/237 |

FOREIGN PATENT DOCUMENTS

0327856 8/1989 European Pat. Off. ............. 99/353

*Primary Examiner*—Timothy F. Simone
*Attorney, Agent, or Firm*—Paul W. Garbo

[57] ABSTRACT

An apparatus for producing ravioli and other dough capsules containing a filler comprises a rotatable horizontal drum with uniformly spaced cavities in its cylindrical surface, means for suplying a first dough sheet to the top of the drum, a filler feed header flexibly suspended thereover and containing a gear pump with discharge nozzles aimed downwardly at the cavities, active drive means for moving the header, passive drive means for the pump to meter gobs of filler through the nozzles, means for supplying a second dough sheet over the first sheet with filler gobs thereon, and a roller to press the second sheet against the first sheet to fuse them around the filler gobs. The dough-encapsulated filler gobs are cut from the fused dough sheets as ravioli or like product.

20 Claims, 3 Drawing Sheets

APPARATUS FOR ENCAPSULATING FILLER WITH DOUGH

BACKGROUND OF THE INVENTION

This invention relates to means for encapsulating a filler with fresh dough. Various products in the form of dough envelopes containing a filler are an important segment of the processed food industry. Ravioli, won ton, pierogies and kreplach are popular examples of pasta-type products while apple dumplings are illustrative of baked goods. Hereinafter, the term ravioli is intended and used as a generic expression for all food products in which a filler is encapsulated in dough.

Many of these products are made by hand or with devices that require stepwise operation. Ravioli have perhaps received the greatest attention and efforts to develop machinery for their rapid production. Currently, a sheet of fresh pasta receives spaced gobs of filler such as ricotta or ground meat and another sheet of fresh pasta is laid thereover. The two pasta sheets are pressed together around each gob of filler so that each filler gob is sealed between the pasta sheets. Then a cutter is used to cut around each dough-encapsulated filler gob to yield individual ravioli.

In my copending patent application Ser. No. 356,221, filed May 24, 1989, now U.S. Pat. No. 4,941,402 an apparatus for the continuous production of ravioli is disclosed and claimed. That apparatus is capable of producing only ravioli with perimeters that are rectangular because the apparatus has two sets of cutters disposed at right angles to each other. However, there is a growing demand by consumers for ravioli with circular, elliptical and other non-rectangular perimeters.

It is therefore a principal object of this invention to provide an apparatus for the rapid and high-volume production of dough capsules containing a filler.

Another important object is to provide such an apparatus that can produce ravioli with perimeters that are circular, oval or other unusual shape such as hexagonal.

Still another important object is to provide means for delivering carefully metered and uniformly spaced gobs of filler on a moving sheet of dough.

These and other features and advantages of the invention will be apparent from the description which follows.

SUMMARY OF THE INVENTION

The basic sections of the apparatus of this invention are a rotatable horizontal drum with uniformly spaced cavities in its cylindrical surface, means for supplying a first sheet of fresh dough to the top of the drum, a filler feed header flexibly suspended over the drum and containing a gear pump with discharge nozzles aimed downwardly at the cavities in the drum, active drive means for simultaneously moving the feed header horizontally and vertically, passive drive means for the pump to meter uniform gobs of filler through the discharge nozzles, means for supplying a second sheet of fresh dough over the first dough sheet with filler gobs thereon, and a sealing roller parallel to the drum and positioned to press the second dough sheet against the first dough sheet to fuse them together around the filler gobs.

The novel features of the apparatus are most conspicuous in the filler feed header and the active and passive drive means associated with the header. Other novel features will be evident as the disclosure is presented in greater detail.

The feed header having a length substantially that of the drum is suspended from a support shaft positioned vertically above the axis of the drum and parallel thereto. Suspension members for the feed header that hang from the support shaft are free to oscillate on the shaft or with the shaft if its ends are held in bearings. Besides being able to swing, the suspension members embody spring means that permit the feed header to be oscillated up and down. In short, the flexible suspension of the feed header permits simultaneous oscillatory and reciprocatory movement of the header.

The active drive means for imparting the simultaneous oscillatory and reciprocatory movement to feed header, which is the same as simultaneous horizontal and vertical movement, comprises a lever rod having one end pivotally connected to the feed header and its opposite end pivotally connected to a driven rotary eccentric, and a fulcrum arm having one end pivotally connected to an intermediate point in the lever rod and its opposite end pivotally connected to a fixed point. The rotary eccentric is driven in coordination with the rotation of the drum by any known synchronizing drive means such as a gear train extending from the shaft of the drum to the shaft of the eccentric. The drum and rotary eccentric have the same rotational direction.

The passive drive means for the gear pump in the feed header comprises an overruning clutch mounted on the end of a pump shaft extending out of an end of the header, a crank arm attached to the clutch for rotation therewith, and a pump drive rod having one end pivotally connected to the crank arm and its opposite end pivotally connected to a fixed point. It will be noted that the passive drive means for the pump causes operation of the pump solely by virtue of the movement of the feed header which is energized by the driven rotary eccentric and transmitted through the lever rod and fulcrum arm of the active drive means.

BRIEF DESCRIPTION OF THE DRAWINGS

For a fuller understanding of the invention, the further description thereof will refer to the accompanying drawings of which.

DESCRIPTION OF PREFERRED EMBODIMENTS

Figure 1:
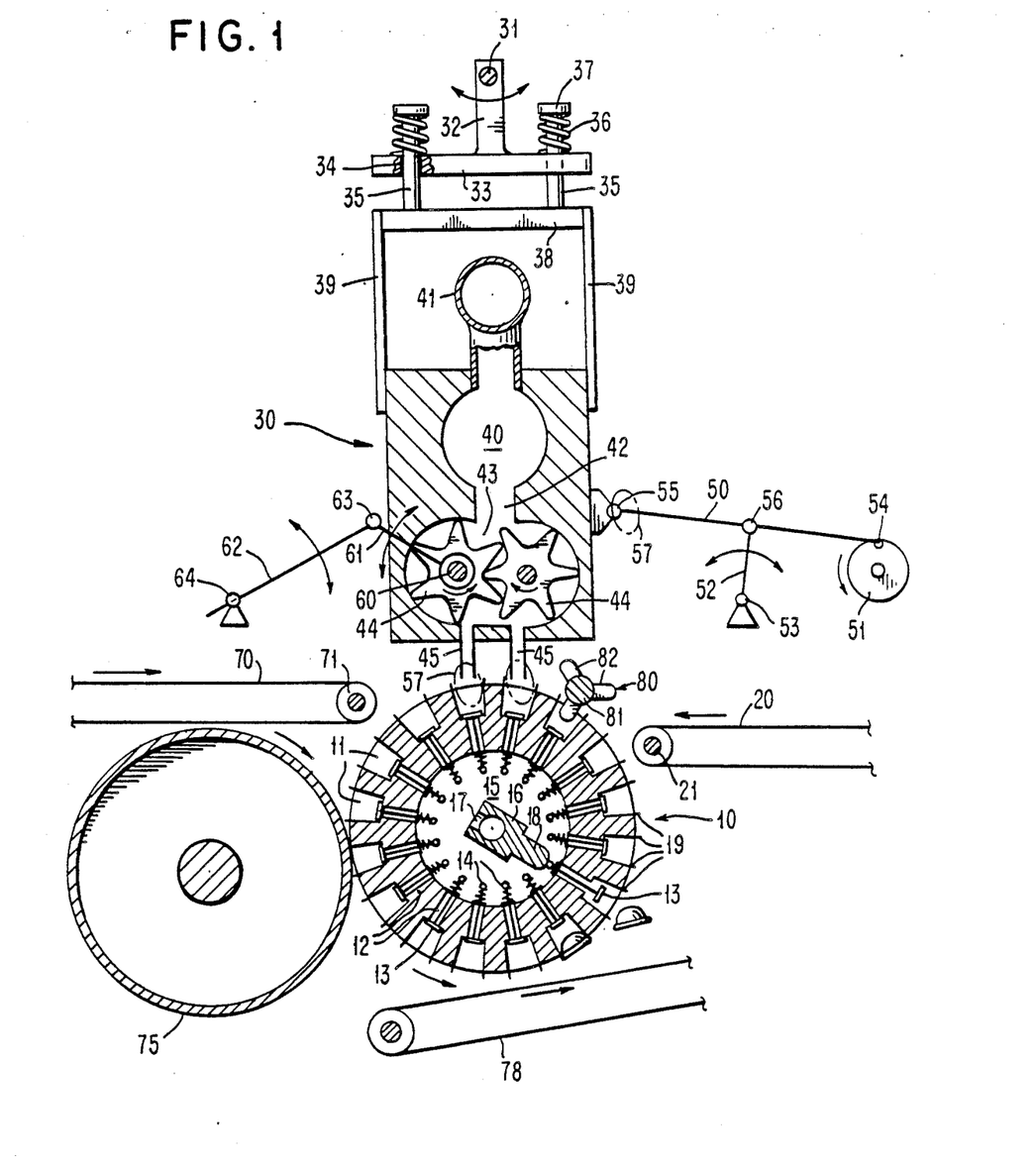
FIG. 1 is a schematic representation of the basic sections of the apparatus of the invention, including a sectional view of the drum and filler feed header taken normal to the axis of the drum.

FIG. 1 shows a diagrammatic section of main drum 10 with a multiplicity of cavities 11 uniformly spaced over the circumference of drum 10. The sectional diagram is through cavities 11 and shows that each cavity 11 has a bottom bore 12 which is normally sealed by spring-loaded valve 13 having mechanically displaceable stem 14. Hollow center 15 of drum 10 has non-rotary or fixed duct 16 extending coaxially therein. Duct 16 has one or more apertures 17 to permit the flow into hollow chamber 15 of pressurized gas, usually air, supplied to duct 16 where it extends out of drum 10. Duct 16 has bumper 18 mounted thereon and radially positioned to momentarily contact and thus displace valve stem 14 of each cavity 11 as it passes across the radial position of bumper 18 in the lower part of drum 10.

Conveyor belt 20 which has its rollers 21 (only one shown) parallel to drum 10 is positioned to supply a sheet of fresh dough to the upper portion of drum 10.

Filler feed header 30 is flexibly suspended over drum 10 from shaft 31 which is in the vertical plane through the axis of drum 10 and is parallel to that axis. The suspension means comprises hanger body 32 with a bore through which shaft 31 passes. Inasmuch as drum 10 and feed header 30 are usually more than a foot in length, two hanger bodies 32 are mounted on shaft 31, spaced from one another. Hanger body 32 has cross member 33 with bores 34 near its opposite ends. A piston rod 35 can freely slide up and down in each bore 34. Compression spring 36 surrounds the top portion of each rod 35 and is captured between cap 37 on rod 35 and cross member 33. The bottoms of piston rods 35 are welded or otherwise fastened to horizontal bar 38 which has vertical bars 39 extending from its opposite ends to the opposite sides of feed header 30. If shaft 31 is held tightly in hanger 32, the ends of shaft 31 are freely supported in bearings. Alternatively, if shaft 31 fits loosely in hanger 32, the ends of shaft 31 may be supported in clamps. In either case, it is evident that a force applied to either elongate side of header 30 will cause it to sway like a pendulum. Additionally, a vertical force applied to header 30 will move it vertically because of spring-loaded piston rods 35. Springs 36 sustain header 30 at a desired distance over drum 10 when no force is applied to header 30. When both vertical and horizontal forces are applied to header 30, piston rods 35 permit header 30 to move up and down while hanger body 32 is free to swing.

Feed header 30 has manifold channel 40 extending lengthwise therein which can be supplied through elbow 41 with filler such as ricotta, creamed spinach or chopped meat pumped from an external source via a flexible hose (not shown) connected to elbow 41. In turn, manifold 40 has slot 42 which communicates with pump chamber 43. The pump is of the well-known gear type in which two identical impellers 44 having a gear shape are rotatable in meshing engagement with each other. The bottom of header 40 is shown with two discharge nozzles 45 for delivery of filler pumped therethrough by impellers 44. Nozzles 45 point down at adjacent cavities 11 directly above the axis of drum 10 and the spacing between adjacent nozzles 45 is the same as that between adjacent cavities 11. Along the length of header 30 there are as many nozzles 45 as there are cavities 11 in longitudinal alignment in drum 10 and the uniform spacing between nozzles 45 coincides with the uniform spacing between aligned cavities 11. For example, if drum 10 has twelve cavities 11 in longitudinal alignment, header 30 has two rows of twelve nozzles 45 aimed at two rows of cavities 11.

The active drive means for moving feed header 30 has three essential elements; lever rod 50 having one end pivotally connected at 55 to header 30, driven rotary eccentric 51 pivotally connected at 54 to the other end of lever rod 50, and fulcrum arm 52 with one end pivotally connected at 56 to an intermediate point in lever rod 50 and with its other end pivotally connected to a fixed point 53.

The rotational direction of eccentric 51 is made the same as that of drum 10 which is driven by an electric motor. As is well known, a gear train or sprocket gears with linking chain can be used not only to transmit power from the shaft of drum 10 to the shaft of eccentric 51 but also to rotate eccentric 51 at a desired predetermined speed relative to the speed of drum 10. For example, if drum 10 has sixteen cavities 11 in circumferential alignment, eccentric 51 must make eight revolutions per revolution of drum 10 because feed header 30 is shown with two adjacent rows of nozzles 45 for simultaneous discharge of filler to two adjacent rows of cavities 11 in drum 10. If header 30 would be provided with only one row of nozzles 45, then eccentric 51 would have to make sixteen revolutions per revolution of drum 10. It is obvious that two rows of nozzles 45 are preferred over one especially when drum 10 has more than say, eight or ten cavities 11 in each circumferential alignment, because reducing the cycles of push and pull forces exerted by eccentric 51 and rod 50 on header 30 by half logically leads to a better mechanical system with less stresses and vibrations.

As eccentric 51 rotates counterclockwise and starting with pivotal connection 54 of lever rod 50 at its highest point on eccentric 51, rod 50 begins to move toward the left and downward. The downward movement of connection 54 causes opposite pivotal connection 55 of rod 50 to rise because of the force exerted by fulcrum arm 52 on lever rod 50 at its pivotal connection 56. Thus, as connection 54 reaches its furthest position toward the left, opposite connection 55 of rod 50 reaches its highest position in orbit 57 of its movement. In the next quarter turn of eccentric 51, connection 54 moves downward and toward the right, while connection 55 is pulled downward and toward the right. In the next quarter turn of eccentric 51, connection 54 moves upward and toward its furthest right position, while connection 55 travels toward the left and downward to its lowest position in orbit 57 of its movement. In the last quarter turn of eccentric 51, connection 54 moves toward the left and upward to its highest position in the circular orbit of its movement; simultaneously connection 55 of rod 50 travels upward from its lowest orbital position and toward the left to complete its cyclic motion. Of course, when connection 54 moves toward the left in FIG. 1, fulcrum arm 52 swings counterclockwise on its pivotal connection 53, while movement of connection 54 toward the right causes a clockwise swing of arm 52.

It will noted that counterclockwise rotation of eccentric 51 causes counterclockwise circular movement of connection 54 which transmits through lever rod 50 pivoted by connection 56 on fulcrum arm 52 a reverse or clockwise orbital movement 57 of connection 55 as well as all of header 30. In most cases the shape of orbit 57 will be elliptical as illustrated in FIG. 1 but can be varied relative to the proportions of its long and short axes as well as to the angle between its long axis and a vertical line. The variations which can even yield a circular orbit that is rarely selected are achieved by changing the dimensions and/or positions of the elements that form the active drive means of the invention. For example, increasing the radial distance of connection 54 from the center of eccentric 51 will increase the long axis of orbit 57. The same variation can be achieved by placing pivotal connection 56 on rod 50 closer to connection 54. Of course, reducing the radial distance of connection 54 on eccentric 51 and/or increasing the distance between connections 54 and 56 will shorten the long axis of orbit 57. Those skilled in mechanical and mathematical analysis will readily visualize how the positioning and dimensioning of the elements of the positive drive means can be varied to produce any desired orbital movement of connection 55 and all of header 30 with nozzles 45. Since nozzles 45 travel in orbits of identical size and shape as orbit 57 of connection 55, it becomes evident that the width or short axis of orbit 57 is made not more than, and usually slightly less than, the circumferential width of cavities 11.

It should be observed that the clockwise movement of nozzles 45 in their orbit 57 is contrary to the counterclockwise rotation of drum 10. Thus, as cavities 11 are moving to the left toward the highest point of drum 10, nozzles 45 are moving to the right and downwardly toward the leading edges of cavities 11. As cavities 11 are passing over the highest point of drum 10, nozzles 45 are passing through the lowest point of their orbits 57 and begining to move upward to complete their cyclic orbital movement 57. Whether or not the open ends of nozzles 45 actually dip into cavities 11 is controlled by the positioning and dimensioning of the previously discussed elements of the positive drive means. These variables can also be adjusted depending on the flow characteristics of the filler being discharged by nozzles 45. For example, creamed spinach will tend to be more fluid but stringy than ricotta which will tend to be less short or crumbly than chopped meat filler. In most cases, however, the maximum entry of nozzles 45 into cavities 11 is less than about one-fourth of the depth of cavities 11.

The passive drive means for the gear-type pump in header 30 has three essential elements: overriding clutch 60 mounted on the end of the shaft (clutch 60 appears in FIG. 1 mounted on the sectioned part of the shaft solely to illustrate its relation thereto) of one of pump impellers 44 extending out of an end of header 30, crank arm 61 fastened to overriding clutch 60 for rotation therewith, and pump drive rod 62 having at one end pivotal connection 63 to crank arm 61 and at its opposite end pivotal connection 64 at a fixed point. The pumping performed by the rotation of impellers 44 results solely from the reaction of the passive drive means to the movement of feed header 30 caused and controlled by driven eccentric 51 and associated lever rod 50 and fuldrum arm 52 as previously explained.

When the active drive means causes feed header 30 to start moving downward in its cyclic orbit 57 which means that header 30 is swinging to the right, pump drive rod 62 creates a reactive pull to the left on crank arm 61 which in turn acting through overriding clutch 60 causes rotation of impeller 44 equipped with clutch 60 as well as the other interlocking impeller 44. Pumping by impellers 44 continues until header 30 starts to move upward in its orbit 57 which means that header 30 is swinging to the left; simultaneously, drive rod 62 creates a reactive push to the right on crank arm 61. While crank arm 61 is moving to the right, clutch 60 is rotating clockwise but is slipping so that there is no engagement with its impeller 44. Therefore, during this portion of the cyclic movement of header 30, there is no pumping. Of course, pumping recommences immediately as header 30 again begins to move downward as already explained. Each time crank arm 61 is pulled by rod 62, clutch 60 and impeller 44 on which it is mounted are given a partial counterclockwise turn and the other interlocking impeller 44 executes an equal partial but clockwise turn, thus metering out through nozzles 45 a selected quantity of filler. As soon as and while crank arm 61 is pushed by rod 62, clutch 60 is given a partial clockwise turn but slips and thus does not turn its impeller 44. Hence, while header 30 is swinging to the left, there is no pumping of filler.

The amount of filler dispensed by feed header 30 through nozzles 45 during each cycle of motion imparted to header 30 by the active drive means can easily be varied even while the apparatus is in operation. To increase the size of filler gobs issuing from nozzles 45, pivotal connection 63 on crank 61 is moved closer to clutch 60. Conversely, moving connection 63 on crank 61 further away from clutch 60, decreases the size of the filler gobs. Drive rod 62 is desirably held in pivotal connection 64 by clamping means that permit immediate release therefrom so that while the apparatus is in operation the discharge of filler from nozzles 45 can be promptly stopped when it is deemed necessary. The clamping means at pivotal connection 64 also makes it easy to change the effective length of rod 62, i.e., the distance between pivotal connections 63 and 64. A change in the effective length of rod 62 may be required to compensate a change in the position of connection 63 on crank arm 61.

After the first dough sheet has been brought to the top portion of drum 10 by conveyor 20 and two rows of filler gobs have been deposited thereon from the two rows of nozzles 45 while a pair of adjacent rows of cavities 11 were moving under and in step with the cyclic movement of nozzles 45, a second fresh dough sheet is brought by conveyor 70 to drum 10. The second dough sheet laid over the first dough sheet with gobs of filler deposited thereon is carried around by rotating drum 10 into the bite between drum 10 and sealing roller 75 which is parallel to, and in contact with, drum 10. Both roller 71 of conveyor 70 and sealing roller 75 are rotated clockwise by a gear train or sprockets with linking chain that transmit rotational power from the shaft of drum 10 in proper coordination with the rotation of drum 10.

Cavities 11 have rims or edges 19 at their open ends that protrude slightly out of the cylindrical surface of drum 10. Actually, the contact of sealing roller 75 with drum 10 is solely with edges 19 of cavities 11. As the two superimposed sheets of dough are carried by drum 10 into its bite with sealing roller 75, they are pressed together and fused into a single sheet around each gob of filler. While the smooth cylindrical surfaces of drum 10 and roller 75 effect the sealing of the two dough sheets as they pass through their bite, protruding rim 19 of each cavity 11 squeezes through the dough sheets and actually makes direct contact with the surface of roller 75; in short, rim 19 diecuts the dough-encapsulated gob of filler out of the fused single dough sheet.

As each cavity 11 travels beyond the bite between drum 10 and roller 75, the dough-encapsulated gob of filler or ravioli in that cavity 11 tends to fall away from rotating drum 10 as the finished product. However, to make the removal of the ravioli from every cavity 11 a certainty, each cavity 11 moving past bumper 18 will have stem 14 of its valve 13 pushed to cause a spurt of pressurized air in chamber 15 to flow through port 12 into cavity 11 thus forcibly ejecting the ravioli therefrom if it did not previously fall out. As soon as stem 14 loses contact with bumper 18, spring-loaded valve 13 is reseated so that air can no longer escape. While a bin or chute may be used, conveyor 78 is shown under drum 10 to gather and convey the ravioli falling from drum 10 to a packaging or cooking station. The single fused dough sheet from which the ravioli were die-cut and removed is lace-like, i.e., is highly perforated. This perforated dough sheet comes off drum 10 below its bite with roller 75 and is gathered and conveyed away for reworking and reuse as the first and/or second dough sheet in the further production of ravioli.

When the dough deposited on drum 10 does not easily sag of its own weight in cavities 11 and a predetermined sag is desired, dimpling means can be used to ensure the proper amount of dough stretching or sag in each cavity 11. This optional accessory may be provided by a mechanical dimpler 80 having rotatable shaft 81 that is parallel to drum 10 and near its cylindrical surface. A few fingers 82 radiate from shaft 81 and are circumferentially aligned and separated from one another by equal angles. In FIG. 1, the dimpler has three radial fingers 82 each of which has a diameter smaller than that of circular cavity 11 and a length that reaches into not more than one-fourth of the depth of cavity 11. Like nozzles 45 which move clockwise in their orbits 57, dimpler 80 rotates clockwise so that a finger 82 approaches the leading edge of a cavity 11 as it moves counterclockwise toward dimpler 80 and withdraws from cavity 11 near its trailing edge as cavity 11 continues to move past dimpler 80. The proper rotation of dimpler 80 in relation to the rotation of drum 10 so that no finger 82 contacts any part of drum 10 is mechanically achieved, as is well known, by a gear train or by sprocket gears and linking chain that will transmit rotational power from the shaft or axle of drum 10.

Dimpling of the first dough sheet laid on drum 10 may be performed pneumatically. In such case, in lieu of dimpler 80 shown in FIG. 1, a gas nozzle in the same position of dimpler 80 and aimed radially at cavity 11 can be used to eject a spurt of pressured air each time a cavity 11 moves into radial alignment with the gas nozzle. The successive spurts of air are controlled by a solenoid valve in the pipe supplying pressured air to the gas nozzle; the release of an air spurt is electrically triggered each time a cavity 11 is directly in front of the gas nozzle. Of course, if pneumatic dimpling is desired, a gas nozzle must be provided for each of cavities 11 in longitudinal alignment in drum 10. Thus, if drum 10 has twelve cavities 11 equally spaced from one another along the length of drum 10, then twelve gas nozzles must be provided with corresponding spacing. Similarly, if mechanical dimpling is used, the set of radial fingers 82 is repeated twelve times, uniformly spaced on shaft 81, so that one set of fingers 82 is aligned with each circumferential series of cavities 11. As previously mentioned, neither pneumatic nor mechanical dimpling means is required if the dough formulation used with the apparatus of the invention yields a dough sheet that naturally sags in cavities 11 to the extent desired.

Figure 2:
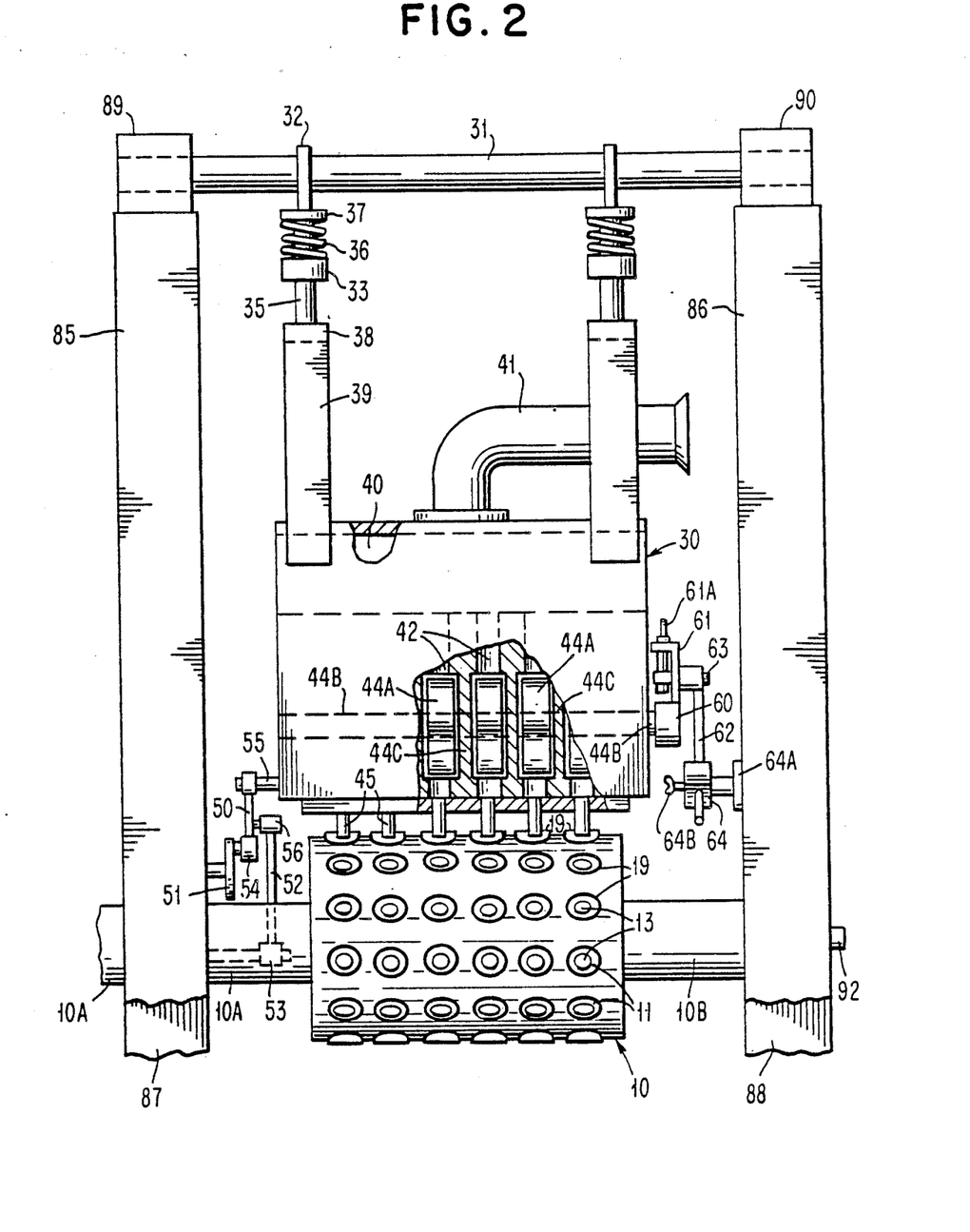
FIG. 2 is a left side view of only the drum and filler feed header of FIG. 1 together with a support structure.

FIG. 2 is a left elevational view of drum 10 and feed header 30 of FIG. 1 supported by four upright columns 85, 86 and 87, 88 in back of 85, 86. Upright columns 85, 87 support cross beam 89 and columns 86, 88 support beam 90. Shaft 31 extends from beam 89 to beam 90. Each of two hanger bodies 32 with a bore through which shaft 31 passes has cross member 33 with bores 34 near its opposite ends. A piston rod 35 is fitted in each bore 34. Compression spring 36 surrounds the top portion of each rod 35 and is captured between cap 37 on rod 35 and cross member 33. The bottoms of piston rods 35 are welded to bar 38 which has vertical bars 39 extending from its opposite ends to the opposite sides of feed header 30. Each hanger 32 is held in place on shaft 31 by spot welds; shaft 31 has its opposite ends freely supported in bearings set in beams 89, 90. Thus, header 30 can be moved pendulum-like because of shaft 31 freely held in bearings, and can be moved up and down because of piston rods 35 and springs 36.

Feed header 30 is partially broken away to reveal a preferred form of pump impellers 44. While the two meshing impellers 44 may each have an axial dimension corresponding to approximately the length of header 30, it is preferred to make each impeller 44 in the form of segments 44A mounted on a common shaft 44B and separated by dividers 44C. As shown in FIG. 2, an impeller 44A is positioned directly above each nozzle 45. Thus, each pair of meshing impeller segments 44A positively pumps the very same amount of filler to each nozzle 45 regardless of its position in the longitudinal alignment.

The drive means for imparting simultaneous pendulum-like and vertical reciprocatory movement to feed header 30 is provided by lever rod 50 having one end pivotally connected at 55 to header 30 and its other end pivotally connected at 54 on driven rotary eccentric 51. The drive means for eccentric 51 is within box column 87 but may be positioned elsewhere. Fulcrum arm 52 has one end pivotally connected to fixed point 53 on upright 87 (behind 85) and its other end pivotally connected at an intermediate point 56 of lever rod 50. As previously mentioned with reference to FIG. 1, the bracket for pivotal connection at 53 in FIG. 3 may be moved on column 87 to adjust the position of fixed point 53.

The passive (reaction to driven rotary eccentric 51) drive means for the gear-type pump in header 30 is provided by overriding clutch 60 mounted on the end of shaft 44B of a pump impeller 44 extending out of an end of header 30 and having crank arm 61 attached thereto for rotation therewith; pump rod 62 has one end pivotally connected at 63 to crank arm 61 and its opposite end pivotally connected at fixed point 64 provided by bracket 64A mounted on upright 86. Pump rod 62 extends through a bore in pivotal connection 64 and is held in place by wing screw 64B. By loosening screw 64B, the pumping of filler can be immediately stopped because rod 62 will then merely slip back and forth in pivotal connection 64 without moving crank arm 61 even though header 30 is still moved by driven rotary eccentric 51. When screw 64B is tightened, the pumping of filler is promptly started. Crank arm 61 has pivotal connection 63 adjustably positioned thereon by a long wing screw 61A that can move connection 63 along slot 61B in arm 61. As previously explained, moving connection 63 closer to clutch 60 increases the size of the filler gobs pumped through nozzles 45 with each rotation of eccentric 51.

Filler is fed to header 30 by a flexible hose (not shown) connected to elbow 41 that discharges into manifold channel 40 with bottom slots 42 communicating with pump chamber 43 of each meshing pair of impeller segments 44A. In turn, each pair of impeller segments 44A pumps out the filler through the two nozzles 45 directly under that pair.

FIG. 2 shows the position of drum 10 with cavities 11 in relation to feed header 30. The left end of axle 10A of drum 10 is supported in a bearing (not shown) between uprights 85, 87 and extends beyond uprights 85, 87 to an electric motor (not shown). The right end of axle 10B is supported in a bearing (not shown) between uprights 86, 88. Pipe 92 which passes co-axially through right axle 10B serves for the injection of compressed air from an outside source into duct 16 (FIG. 1) and thence through apertures 17 into hollow chamber 15 of drum 10. Each of cavities 11 in drum 10 has valve 13 at its bottom and a cutting edge or rim 19 at its top periphery.

Figure 3:
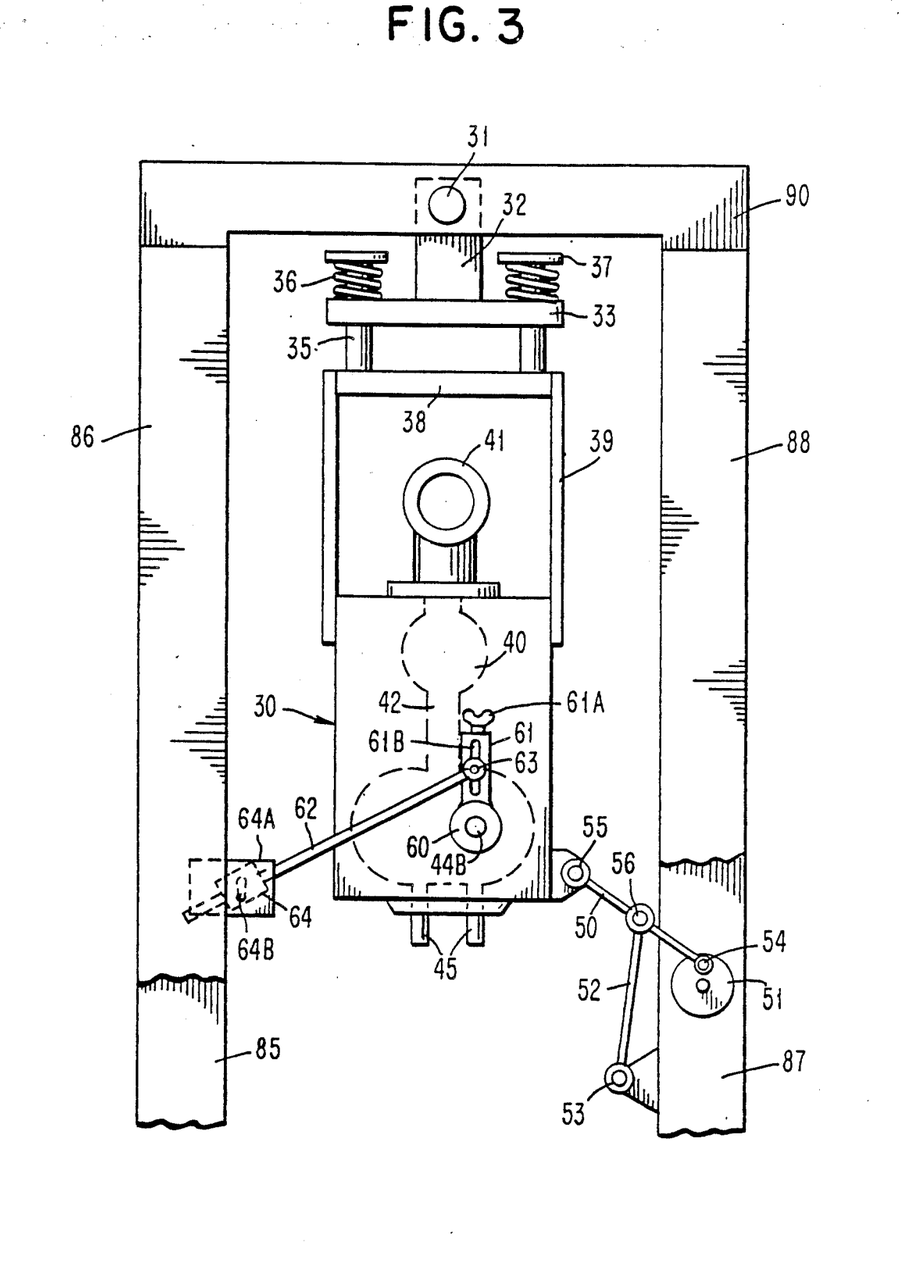
FIG. 3 is a right end view of only the feed header and support structure of FIG. 2.

The apparatus and its operation have already been fully described with reference to FIG. 1 so that further elaboration of FIGS. 2 and 3 is unnecessary. Rather, it is well to point out that feed header 30 has utility apart from drum 10. For example, drum 10 may be replaced by a conveyor belt on which measured gobs of dough or other pumpable composition can be deposited while the belt is moving at a desired speed. In such case, referring to FIG. 1, the top run of a continuous conveyor belt would pass under nozzles 45, moving from right to left, in lieu of drum 10 rotating counterclockwise. With each rotation of driven rotary eccentric 51, feed header 30 also moves from right to left and simultaneously deposits measured gobs of material on the belt, whereupon header 30 is pulled back toward the right to start again its movement toward the left with the next rotation of eccentric 51. When depositing gobs of dough or other material on a flat belt, fulcrum arm 52 may be eliminated.

It is obvious that the novel feed header 30 is uniquely simple in operation inasmuch as the rotation of eccentric 51 not only moves header 30 in a predetermined cyclic manner but also effects the pumping of measured gobs of material by the reaction of the passive pump drive means (60,61,62,63,64) to that movement of header 30. Those skilled in the art will readily visualize many variations and modifications of the invention and its various applications without departing from the spirit or scope of the invention. Accordingly, only such limitations should be imposed on the invention as are set forth in the appended claims.

What is claimed is:

1. An apparatus for the production of ravioli which comprises a rotatable horizontal drum having a multiplicity of equally spaced cavities in both longitudinal alignment and circumferential alignment, a first conveyor positioned to feed a first dough sheet on the upper portion of said drum, a shaft disposed above and parallel to said drum, a suspension means connected to said shaft for oscillatory motion and embodying spring means to permit vertical reciprocatory motion, a filler feed header suspended over said drum by attachment to said suspension means, said header having an alignment of equally spaced discharge nozzles aimed downwardly at said longitudinal alignment of said cavities, a lever rod having one end pivotally connected to a rotary eccentric and its other end pivotally connected to said feed header, a fulcrum arm having one end pivotally connected to an intermediate point in said lever rod and its other end pivotally connected to a fixed point, a gear pump within said feed header with a shaft end of said pump extending out of an end of said feed header, an overrunning clutch mounted on said shaft end, a crank arm attached to said clutch for rotation therewith, a pump drive rod having one end pivotally connected to a fixed point, a second conveyor positioned to feed a second dough sheet to said drum over said first dough sheet with filler gobs thereon deposited by said nozzles, a sealing roller parallel to said drum and positioned to press said second dough sheet against said first dough sheet thereby sealing said first and second dough sheets around said filler gobs, and synchronous drive means for said drum, said rotary eccentric, said sealing roller, said first conveyor and said second conveyor.

2. The apparatus of claim 1 wherein the rim of each cavity protrudes slightly from the surface of the drum.

3. The apparatus of claim 2 wherein the drum has a concentric cylindrical hollow, the bottom of each of the cavities has a bore communicating with said hollow, a spring-loaded normally-closed valve is positioned in each said bore with the valve stem projecting into said hollow, a fixed tube extends axially through said hollow for the introduction of compressed air into said hollow, and a bumper is mounted at a predetermined radial position on said tube to momentarily displace the valve stem of each said valve when by the rotation of said drum each longitudinal alignment of said cavities passes across said radial position of said bumper.

4. The apparatus of claim 3 wherein a third conveyor is positioned to receive the ravioli produced on the drum.

5. The apparatus of claim 1 wherein a dimpler is positioned to stretch the first dough sheet inwardly in each of the cavities prior to the deposition of filler gobs by the nozzles.

6. The apparatus of claim 1 wherein the filler feed header has two parallel alignments of equally spaced discharge nozzles aimed downwardly at two longitudinal alignments of cavities in the drum.

7. The apparatus of claim 6 wherein the rim of each cavity protrudes slightly from the surface of the drum, and a dimpler is positioned to stretch the first dough sheet inwardly in each said cavity prior to the deposition of filler gobs by the nozzles.

8. The apparatus of claim 1 wherein the position of the fixed point to which the fulcrum arm is pivotally connected is adjustable.

9. The apparatus of claim 1 wherein the position of the pivotal connection of the pump drive rod to the crank arm is adjustable, and the pivotal connection of said drive rod to a fixed point can be released.

10. The apparatus of claim 9 wherein the position of the fixed point to which the fulcrum arm is pivotally connected is adjustable, the rim of each cavity protrudes slightly from the surface of the drum, and a dimpler is positioned to stretch the first dough sheet inwardly in each said cavity prior to the deposition of filler gobs by the nozzles.

11. The apparatus of claim 10 wherein the drum has a concentric cylindrical hollow, the bottom of each of the cavities has a bore communicating with said hollow, a spring-loaded normally-closed valve is positioned in each said bore with the valve stem projecting into said hollow, a fixed tube extends axially through said hollow for the introduction of compressed air into said hollow, and a bumper is mounted at a predetermined radial position on said tube to momentarily displace the valve stem of each of said valve when by the rotation of said drum each longitudinal alignment of said cavities passes across said radial position of said bumper.

12. An apparatus for depositing uniformly spaced gobs of filler on a moving sheet, which comprises moving means for said sheet, a filler feed header extending transversely over the width of said sheet and pivotally suspended thereover for pendulum-like motion, an alignment of equally spaced discharge nozzles aimed downwardly from said feed header at said moving means, a lever rod to oscillate said feed header having at one end a pivotal connection to a driven rotary eccentric and at the opposite end a pivotal connection to said feed header, a gear pump within said feed header with a shaft end of said pump extending out of an end of said header, an overrunning clutch mounted on said shaft end, a crank arm attached to said clutch for rotation therewith, and a pump drive rod having at one end a pivotal connection to said crank arm and at the opposite end a pivotal connection to a fixed point.

13. The apparatus of claim 12 wherein the position of the pivotal connection of the pump drive rod to the crank arm is adjustable.

14. The apparatus of claim 12 wherein the feed header has two parallel alignments of equally spaced discharge nozzles aimed downwardly at the moving means.

15. An apparatus for the production of ravioli which comprises a rotatable horizontal drum having a multiplicity of equally spaced cavities in both longitudinal alignment and circumferential alignment, first feed means to apply a first dough sheet on the upper portion of said drum, a filler feed header movably suspended over and across said drum so that said header can both swing relative to the length of said first dough sheet and reciprocate vertically, said header having an alignment of equally spaced discharge nozzles aimed downwardly at said longitudinal alignment of said cavities, a lever rod having one end pivotally connected to a rotary eccentric and its other end pivotally connected to said feed header, a fulcrum arm having one end pivotally connected to an intermediate point in said lever rod and its other end pivotally connected to a fixed point, a gear pump within said feed header with a shaft end of said pump extending out of an end of said feed header, an overrunning clutch mounted on said shaft end, a crank arm attached to said clutch for rotation therewith, a pump drive rod having one end pivotally connected to said crank arm and its other end pivotally connected to a fixed point, second feed means to apply a second dough sheet over said first dough sheet after passing under said header, a sealing roller parallel to said drum and positioned to press said second dough sheet against said first dough sheet thereby sealing said first and second dough sheets around said cavities, and synchronous drive means for said drum, said rotary eccentric, said sealing roller, said first feed means and said second feed means.

16. The apparatus of claim 15 wherein the rim of each cavity protrudes slightly from the surface of the drum.

17. The apparatus of claim 16 wherein the drum has a concentric cylindrical hollow, the bottom of each of the cavities has a bore communicating with said hollow, a springloaded normally-closed valve is positioned in each said bore with the valve stem projecting into said hollow, a fixed tube extends axially through said hollow for the introduction of compressed air into said hollow, and a bumper is mounted at a predetermined radial position on said tube to momentarily displace the valve stem of each said valve when by the rotation of said drum each longitudinal alignment of said cavities passes across said radial position of said bumper.

18. The apparatus of claim 17 wherein a dimpler is positioned to stretch the first dough sheet inwardly in each of the cavities before said first dough sheet passes under the filler feed header.

19. The apparatus of claim 17 wherein the position of the fixed point to which the fulcrum arm is pivotally connected can be varied.

20. The apparatus of claim 19 wherein the position of the pivotal connection of the pump drive rod to the crank arm can be varied, and the pivotal connection of said drive rod to a fixed point can be released.

* * * * *

UNITED STATES PATENT AND TRADEMARK OFFICE
CERTIFICATE OF CORRECTION

PATENT NO. : 4,996,914

DATED : March 5, 1991

INVENTOR(S) : Joseph C. D'Alterio

It is certified that error appears in the above-identified patent and that said Letters Patent is hereby corrected as shown below:

Column 2, line 15, before "feed" insert --the--.

Column 6, line 52, "diecuts" should be --die-cuts--.

Column 9, line 62, before "a fixed" insert --said crank arm and the other end pivotally connected to--.

Signed and Sealed this

Twenty-first Day of July, 1992

Attest:

DOUGLAS B. COMER

*Attesting Officer*   *Acting Commissioner of Patents and Trademarks*